April 14, 1936.  G. G. WALKER  2,037,608
METHOD OF FORMING METAL PIPE BLANKS
Filed Dec. 5, 1934  2 Sheets-Sheet 1
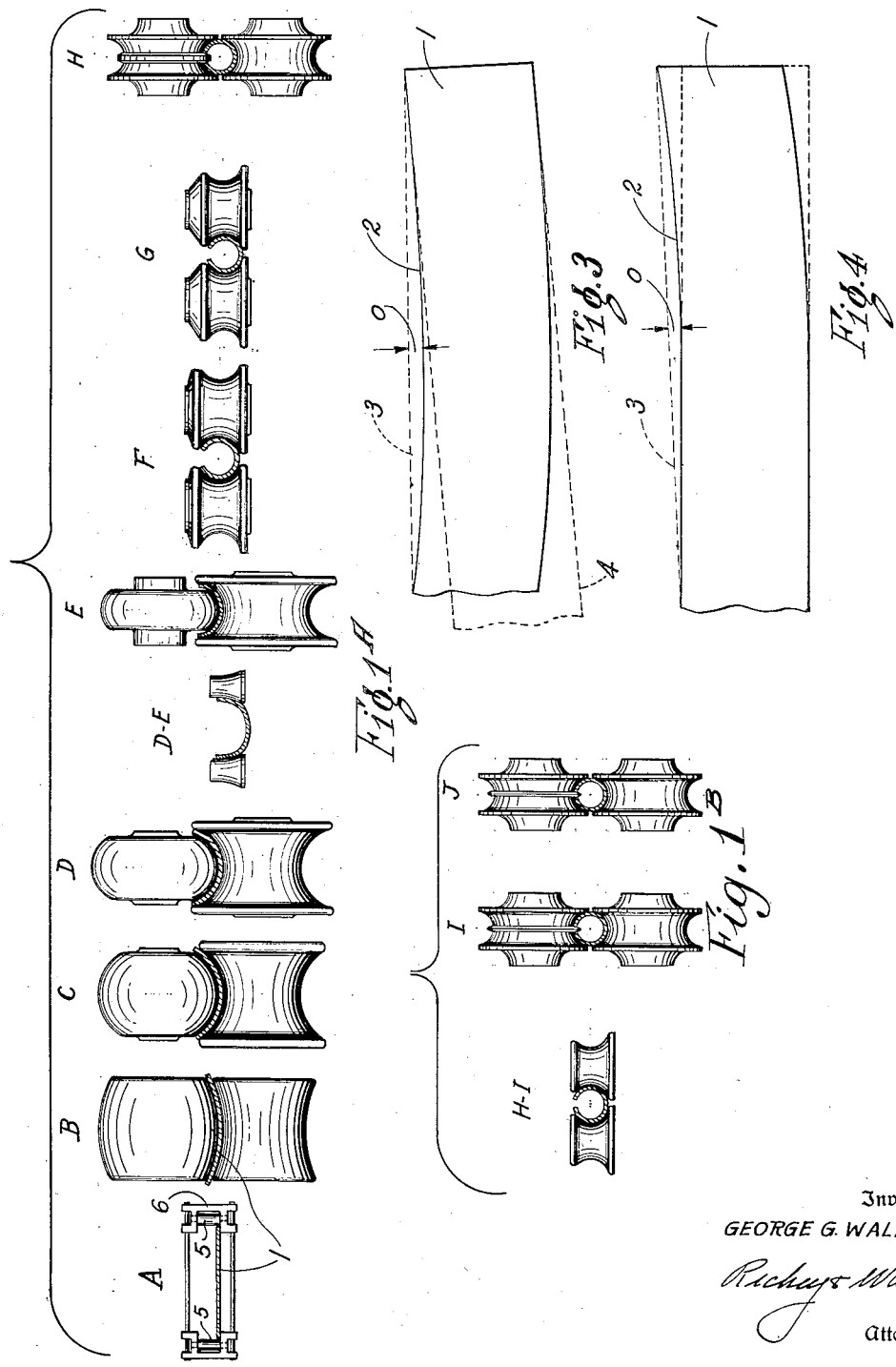
Inventor
GEORGE G. WALKER
Attorneys April 14, 1936.   G. G. WALKER   2,037,608
METHOD OF FORMING METAL PIPE BLANKS
Filed Dec. 5, 1934   2 Sheets-Sheet 2
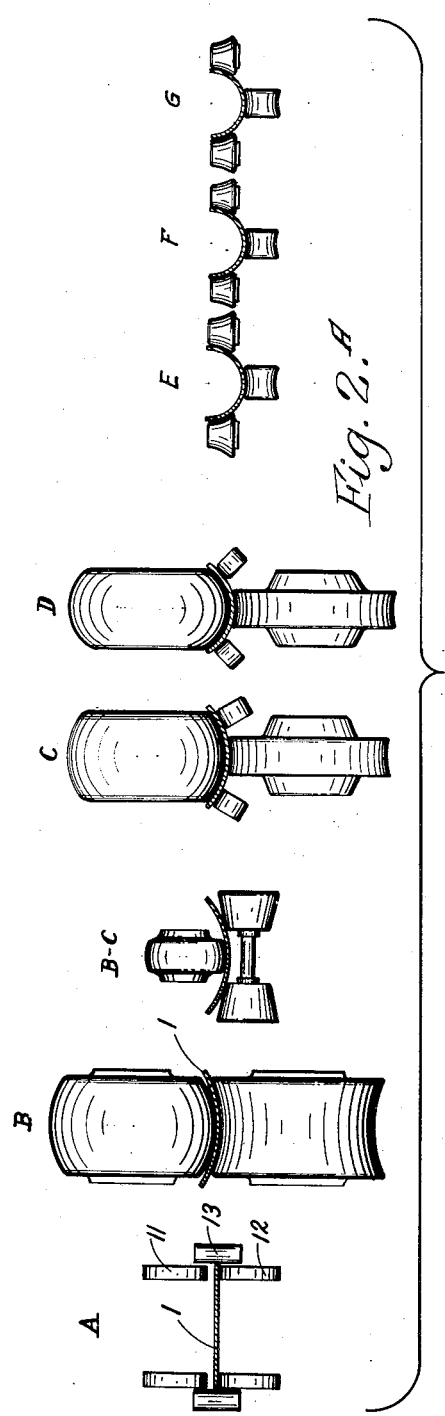
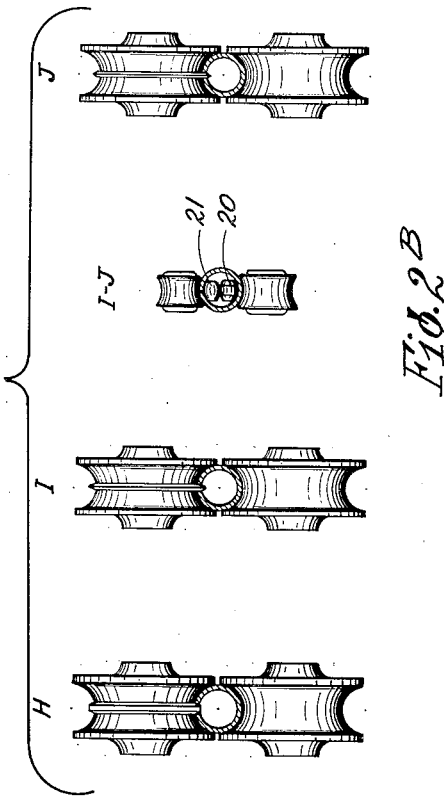
Inventor
GEORGE G. WALKER
Attorneys Patented Apr. 14, 1936

2,037,608

UNITED STATES PATENT OFFICE 2,037,608

METHOD OF FORMING METAL PIPE BLANKS

George G. Walker, Poland, Ohio, assignor to The Republic Steel Corporation, Youngstown, Ohio, a corporation of New Jersey Application December 5, 1934, Serial No. 756,089

7 Claims. (Cl. 153—54)

My invention relates to a new and improved method of forming flat metal into a cylindrical tube or pipe blanks, and more particularly relates to a method of forming cambered flat rolled ferrous metal into pipe blanks with longitudinal seam gaps.

According to one method of manufacturing tube and pipe blanks of relatively large diameter and heavy wall thickness, flat rolled ferrous metal sheets or plates, which stock is commonly known as skelp, is bent into a cylindrical form with opposed longitudinal seam edges, which edges are subsequently welded together. Such bending or shaping of the skelp may be accomplished by passing the skelp between the curved rolls of a plurality of successive roll stands. A mill of this type is illustrated and described in the co-pending application of Lawrence H. Park, Serial No. 565,007, filed September 25, 1931.

The skelp which is used to make the cylindrical blanks, is usually hot rolled from metal bars or ingots. It is difficult to roll this metal so that the finished flat skelp will have straight longitudinal side edges, a certain amount of camber or crookedness of these edges being usually present.

Efforts have been made heretofore to maintain the camber below a rather low maximum because of the difficulty of forming cambered skelp into satisfactory pipe blanks. When the camber exceeded that allowable tolerance it was necessary either to discard the skelp or trim the edges and use it for making smaller diameter pipe. Prior to my invention the maximum allowable camber was approximately 1" in 40 feet.

This small camber tolerance was necessary heretofore, particularly in the formation of pipe to be electric resistance butt welded, because a greater amount of camber would result in a seam gap in the pipe which deviated from a straight line sufficiently far to bring the gap partly or entirely under one of the welding electrodes at some point or other along the pipe, thereby permitting the welding current to flow partly or wholly thru the metal of the pipe instead of across the seam gap and resulting in a poor weld or absence of a weld at such point or points.

The prior practice of forming skelp into a pipe blank for electric resistance butt welding may be readily understood from the following example: The leading end of the skelp was first presented to the guides or pinch rolls at the entering end of the forming zone with the longitudinal center line and the side edges of the skelp so located with respect to the rolls that the seam gap would, for example, be disposed vertically above the center line in the formed pipe blank. The rolls of the several roll passes were so adjusted that they gripped the skelp with sufficient pressure not only to bend the skelp transversely but also to prevent any lateral or edgewise shifting of the skelp between the rolls of any pass. Hence, the skelp was propelled thru the forming zone without any possibility of lateral shifting. If, for example, the skelp was cambered to the right, the center line and both side edges deviated to the right from the position of those respective points at the leading end. As a result of this deviation, the right hand edge occupied progressively higher and higher positions in the rolls, as the skelp advanced endwise until the point of extreme camber was reached, with coincident occupation by the left hand edge of progressively lower and lower positions in the rolls. When the skelp finally attained a tubular shape, the seam gap curved to the left with respect to the location of the seam gap at the leading end and the deviation of the gap from a straight line was more or less on the order of the amount of camber in the flat skelp. Since the electrodes of an electric resistance butt welding machine traverse a straight path on a pipe blank, it is obvious that any deviation of the seam from a straight line will tend to bring the seam gap partly or wholly under one or the other of the welding electrodes, and produce an unsatisfactory pipe.

For these reasons the prior low tolerance of camber was insisted upon and as a result much skelp was either rejected as unsuitable for welding, or was trimmed and used for smaller diameter pipe with attendant cost and loss.

However, by employing the method and apparatus of my invention, I am able to form skelp, having not only more than the previous maximum camber but also irregular camber, into satisfactory pipe blanks without trimming other than for parallelism; and the allowable camber tolerance is so increased that the rolling mill can readily furnish all skelp in usable form without wastage or loss due to trimming to remove camber. Thus skelp 40 inches wide and ¼" inches thick and having as much as 6 inches camber in 50 feet has been formed into pipe blanks which were welded satisfactorily.

In carrying out my invention, I pass the skelp endwise through a forming zone composed of a plurality of roll passes. Preferably each pass bends the skelp substantially on arcs of successively decreasing radii. All passes, except the last few passes at and near to the discharge end, engage the skelp so as to bend it, but do not pinch it so tightly as to prevent lateral or rotational movement of the skelp therein, that is, edgewise of the skelp and relative to the rolls.

In several of the last passes, abutments or fins are provided which engage the skelp edges, work those edges and compel them to become substantially straight and parallel. The forces exerted on these abutments or fins by the curved or cambered edges, result in edgewise shifting of the trailing portions of the skelp in the first several passes, and such movement assists in the operation of straightening the skelp and aligning the edges with the edges of the leading portions in the fin passes.

When cambered skelp enters the forming mill it is gripped by the first several passes and is propelled longitudinally by the rolls. If the skelp is sufficiently cambered to engage side guides at the entering end, the guides force it laterally as it is moving forwardly. This tends to straighten the skelp and also to shift it somewhat edgewise even in the passes where it is being gripped. However, when the leading portions of the skelp enter the finishing or fin passes such portions cannot shift rotationally in those passes, hence they exert a force on the trailing portions which tends to move these trailing portions laterally or rotationally and straighten the skelp so as to align the side edges with those already straightened or aligned by the fin rolls. Some elongation of the cambered skelp occurs in the fin passes and the final straightening and aligning of the side edges results in the formed blank having substantially straight and parallel seam edges.

The lateral movement of the trailing portions of the skelp is similar to the motion of the tail of a fish and hence the term "fish-tailing" has been applied to the present method of forming cambered skelp into tube and pipe blanks.

In this manner, skelp having an amount of camber which greatly exceeds previous permissible limits can be shaped into pipe blanks with substantially straight seam edges without the former loss or waste of material and labor and without the requirement that the rolling mill must keep within a small range of camber.

In the drawings, wherein one method of carrying out my invention is illustrated

Figs. 1A and 1B together constitute a diagrammatic view of a device suitable for carrying out the present invention, showing the entering sides of the several roll passes and the conformation taken by the skelp in the various passes;

Figs. 2A and 2B together constitute a similar view of a modified apparatus;

Fig. 3 is a fragmentary view of cambered skelp;

Fig. 4 is a view showing skelp where the camber is confined to the one end.

Referring now to the drawings, throughout which like parts have been designated by like reference characters, and particularly to Fig. 3, the skelp, 1, as it comes from the rolling mill, very seldom has straight longitudinal side edges. The longitudinal edges 2, although they may be parallel, usually curve either to the right or left. This curvature or deviation from a straight line is known as the camber of the skelp. The amount of camber may be determined by measuring the distance between a curved edge of the skelp and a straight line contacting the edge at two or more points. The skelp shown in Fig. 3 illustrates one form of camber, the amount of camber being represented by the distance "O" between the edge of the skelp and the chord 3. The dotted lines, 4, represent the skelp as it would be if it were straight and free from camber.

Fig. 4 shows a common camber condition where the camber is confined to the trailing end of the sheet. In this instance the leading portion of the sheet, is substantially straight, while the trailing portion, which may be ten feet in a fifty foot sheet of skelp, curves to the right.

Although the illustrations show the camber as extending in one direction only, it may extend in the opposite direction from that shown, or in both directions, in which latter event the result is a skelp of sinuous form. The camber may also vary in magnitude since it is sometimes possible to roll skelp with very little camber, while at other times the camber is considerably greater, depending on conditions at the rolling mill.

As best illustrated in Figs. 1A and 1B the skelp, 1, is introduced to the rollers of the first bending pass B, being guided and centered in its passage to the rolls by a guide pass A. The guide pass may consist of a pair of laterally adjustable side rolls 5 supported in frames 6 and adapted to guide the edges of the skelp in its travel toward the pass B.

The roll passes B, C, D and E are driven, and in this instance comprise upper concave and lower convex rolls; each succeeding pass is disposed in alignment with the others. The skelp enters the forming mill and is engaged between the rolls, the rolls of each pass being adjustably spaced from each other. The skelp is bent in the passes B, C, D and E progressively, and substantially on arcs of decreasing radii from the flat to a concavo-convex or trough form.

The roll stand assemblies for holding the rolls may be substantially as those described in the before-mentioned Park application. The representation in Figs. 1A and 1B is only for convenience of illustration, and is not intended to designate the horizontal position of the skelp in the various passes.

Interposed between the roll stands D and E is a pair of idler rolls D—E, which support the skelp from the pass D to the pass E, at the same time assisting in bending the skelp.

The skelp from pass E passes through two sets of idler roll passes F and G, each of which comprises concave rolls disposed in horizontal alignment with their axes vertically disposed and wherein the opposed edges of the skelp are brought closer together in each succeeding pass, that of pass G bending the skelp to its nearly complete cylindrical form.

From the forming rolls the blank passes to the finishing rolls. Although the pressure upon the skelp between the rolls from pass B to G inclusive is sufficient to bend the skelp, the rolls do not grip the skelp so tightly as to prevent what may be termed as lateral movement of the skelp in pass B or rotary movement of the blank and lateral movement of the edges in the succeeding forming passes. There will actually be some lateral movement of the skelp in passes B to G inclusive when the cambered portion of the skelp engages the fins in the finishing rolls.

Taking the pass H of the finishing rolls as illustrative, each pass comprises a lower concave roll and an upper concave roll. The upper roll is provided with an annular peripheral flange or fin extending radially from the center of the roll. The flange in pass H is relatively thick with walls tapering toward the edge.

These passes are designed particularly for the size of the pipe being made so that the open seam gap of the skelp or pipe blank is completely bridged by the fin. The edges of the skelp engage the tapered side walls of the fin and the pipe is securely engaged circumferentially by the concave portions of the rolls. The blank is thus rigidly held in these passes and rotary or lateral movement is prevented.

The fins and rolls of the fin roll passes, that is, passes H, I and J, positively determine the path of travel of the side edges of the skelp through these passes and compel the side edges to travel in predetermined, straight parallel paths and to become straight and parallel. When the skelp is cambered and the edges would ordinarily tend to diverge from this predetermined path with one edge pressing strongly against the fins or similar abutments, the latter resist such tendency and, in doing so, cause a compensating shifting of the trailing portion of the skelp which brings the edges into the paths of the edges of the leading portions. In other words, the side edges of the skelp are confined to predetermined paths while in the fin roll passes, and when the edges are cambered or crooked the forces exerted by the skelp on the abutments in the fin roll passes result in the shifting, or a fishtailing motion, of the trailing portions of the skelp relative to the rolls, thus straightening the skelp and making the edges substantially straight and parallel and locating them vertically above the longitudinal center line of the skelp when in formed tubular shape.

Engagement of the flange with the edges of the skelp also sizes or works the edges of the pipe.

An idler pass H—I may be provided between finned pass H and I which supports the pipe to the finned pass I. The fin in pass I is of a substantially reduced thickness and has less taper toward its edge, while the radius of the concave portions of the rolls is shorter. Providing the fin with a less degree of taper subjects the edges of the skelp to further sizing and working and also holds the edges against lateral movement causing the seam to assume a straight line from the pass H to I.

In the final pass J the fin is relatively thin and is provided with substantially parallel side walls. The extremity of the fin is tapered to assist in the alignment of the open seam gap of the blank with the fin as it enters the roll pass. The pipe blank being engaged in the passes H, I and J, the edges of the skelp, now the open seam of the pipe blank, are pulled into a straight horizontal line; because of the rigidity with which the pipe is held in passes H, I and J, and because the skelp, although held in the other passes tight enough to effect the bending desired is still not held so tight as to prevent lateral movement of the trailing portions of the skelp when the fins engage the cambered portions.

In Figs. 2A and 2B I have shown another mill set-up which is particularly designed for forming pipe blanks of relatively large diameter. In this mill the guiding pass A comprises two pairs of upper and lower rollers 11 and 12, with their axes horizontally disposed, and two laterally disposed rollers 13, with their axes vertically disposed, bridging the gap between the rollers 11 and 12. The sheet rides on the lower rollers and is guided between the upper and lower rollers and laterally between the side rollers into the driven initial bending pass B. The forming passes comprise the driven roll stands B, C and D, and idler stands E, F and G, with a stand of idler supporting rolls B—C interposed between the passes B and C.

The passes E, F and G each comprises substantially tapered rolls with their axes vertically disposed and positioned on either side of the trough shaped sheet. A concave roll with its axis horizontally disposed is positioned below and at the center of the sheet to support the same.

From the idler rolls the skelp or blank enters the finishing passes H, I and J. These passes are the final finishing passes and are in substance the same as the corresponding lettered passes of Figs. 1A and 1B and operate upon the blank in the same manner. Interposed between I and J is an idler pass I—J comprising upper and lower concave rolls. Interposed between the rolls of the idler pass I—J and supported within the blank are a supporting roll 20 and a convex roll 21 in superposed relation to each other which may operate upon the open seam gap from the inside; pressure being transmitted from the bottom roll through the bottom of the tube through the supporting roll 20 and thence to the convex roll 21 and against the inside of the open seam.

Although I have shown four driven forming rolls in Figs. 1A and 1B as previously described, to start the bending operations on the pipe, and three in Figs. 2A and 2B, it is within the purview of the invention to change the number and size of the rolls, both driving and idler, as is deemed expedient. The same situation applies to the finishing passes of the machine wherein the fin rolls are used. In Figures 1A, 1B, 2A and 2B of the drawings I have illustrated three sets of fin roll passes but it is quite within the purview of the invention to increase the number should it be found desirable. Furthermore, although the rolls are shown as forming pipe blanks with the open seam gap in the top of the blank, it is quite within the purview of the invention to reverse the position of the rolls and form the open seam at the bottom or even on either side.

It is also to be noted that in some instances where excessive camber is found, the guide pass also assists in straightening the skelp since the lateral movement of the skelp is limited by the lateral guides. The skelp is prevented from climbing too far up the side of the guides by the rollers disposed above the sheet.

I have found that by providing a mill of the character described, wherein the skelp is allowed freedom of lateral movement in the early stages of bending, but prevented from such movement as it arrives progressively closer to the stage of the finished blank, the opposite edges of the skelp are brought into a straight horizontal line without in any way materially affecting adversely the properties of the skelp.

The blank upon leaving the forming mill may be conveyed directly to a welding machine where the edges of the open seam gap may be electric resistance butt welded together.

Having thus described my invention, I am aware that numerous and extensive departures may be made therefrom but without departing from the spirit and scope of the appended claims.

I claim:

1. The method of forming pipe blanks which comprises passing an elongated sheet of flat rolled ferrous metal having longitudinal edges cambered in excess of about 1" in a length of 40' through a centering guide into a plurality of successive metal bending roll passes to form the same gradually and progressively into a cylindrical tube, the first several passes being adapted to impart a progressively cylindrical set to the metal while permitting the metal to move edgewise between the rolls, the last several passes being adapted to securely grip the blank and the longitudinal edges thereof to work the edges and to make the said edges substantially straight and parallel.

2. The method of making pipe blanks which includes the steps of moving endwise thru a forming zone, flat rolled metal cambered in excess of a ratio of about 1" per 40' of length, progressively forming the metal from end to end into a pipe blank with a longitudinal, substantially straight seam gap by transversely bending the metal from flat to tubular form in a plurality of successive stages in said zone, and, during such bending, confining the side edges of the leading tubular portions of the skelp in said zone to travel in predetermined substantially straight, parallel paths and to form a substantially straight seam gap while permitting trailing portions of the metal to shift edgewise.

3. The method of making pipe blanks which includes the steps of moving endwise through a forming zone flat rolled steel skelp cambered in excess of about 1" to 40' of length, progressively forming the skelp from end to end into a pipe blank having a longitudinal, substantially straight seam gap by transversely bending the skelp from flat to tubular form on a plurality of successive arcs of successively decreasing radii in said zone, and, during such bending, confining the side edges of the leading tubular portions of the skelp in said zone to travel in predetermined, substantially straight, parallel paths while permitting the trailing portions of the skelp to shift edgewise.

4. The method of making pipe blanks which includes the steps for moving endwise through a forming zone composed of roll passes of successively decreasing radii of curvature, flat rolled steel skelp cambered in excess of about 1" per 40' of length, progressively forming the skelp from end to end into a pipe blank with a longitudinal seam gap by transversely bending it from flat to tubular form in the said successive roll passes in said zone, and during such bending, positively confining to substantially straight parallel lines, the travel of the side edges of leading portions of the skelp in several roll passes near the discharge end of said zone while permitting trailing portions of the skelp to shift edgewise between the rolls in several passes near the entering end of said zone.

5. The method of forming pipe blanks which includes the steps of moving endwise flat rolled metal skelp having a camber in excess of about 1" per 40' of length through a plurality of successive roll passes, successively bending the skelp transversely in the first several roll passes from flat form into a generally cylindrical form, directing the longitudinal edges of the skelp into substantially straight parallel lines by bringing the edges into contact with abutments in the last several roll passes and permitting the forces exerted by the cambered or curved edges of the skelp against the said abutments to shift the skelp edgewise between the rolls of the first several roll passes.

6. The method of making pipe blanks from flat rolled cambered ferrous skelp having above about one inch camber per 40 feet of length which includes the steps of subjecting the cambered skelp to a succession of bending operations to convert it into a tube having an open longitudinal seam and, partially straightening the skelp by permitting it to shift laterally, while bending it transversely into partially tubular form, in the first few of said bending operations, and completing the straightening of the skelp by preventing rotary shifting thereof, while completing the transverse bending into substantially tubular form, in the last few of said bending operations.

7. The method of making pipe blanks which includes the steps of moving flat rolled metal cambered in excess of about 1 inch in 40 feet of length between abutments and then between rolls of a plurality of successive roll passes, gripping the metal in the first few roll passes with pressure sufficient to propel it but insufficient to prevent all edgewise movement thereof, partly straightening portions of the skelp between the abutments and the first few roll passes by bringing an edge thereof into contact with an adjacent abutment with force sufficient partly to straighten such portions of the metal but insufficient to move the metal edgewise in said first few roll passes, gripping the metal in the last few roll passes and confining the path of travel of the edges of the metal therein to substantially straight parallel lines, and exerting forces on the edges of the metal in said last few passes to shift trailing portions of the metal edgewise in the first few passes and thereby to complete the straightening of the edges.

GEORGE G. WALKER.